Patented Aug. 31, 1943

2,328,053

UNITED STATES PATENT OFFICE 2,328,053

PROCESS OF REFINING VITAMIN-BEARING MATERIALS

Loran O. Buxton, Belleville, N. J., assignor to National Oil Products Company, Harrison, N. J., a corporation of New Jersey No Drawing. Application June 4, 1941, Serial No. 396,501

17 Claims. (Cl. 167—81)

This invention relates to the refining of oxidizable fatty materials, more particularly to the refining of fat-soluble vitamin-containing materials to remove objectionable odors and tastes therefrom.

It is well known that vitamins are essential to the health and well-being of humans. For one reason or another, many present day diets do not contain sufficient quantities of certain vitamins to meet the dietary requirements of the average individual. In some cases a person's vitamin requirements may be so high that even the most excellent or well balanced diet will not supply his needs. For these and other reasons, it has been found advisable to either fortify various food products with certain vitamins or to supply these vitamins in some other manner, such as vitamin concentrates. Frequently the natural materials which are used to furnish vitamins for these purposes possess undesirable tastes and odors. This is true particularly in the case of fish liver oils and other marine oils which are the most important natural sources of vitamins A and D. These oils, and concentrates produced therefrom, usually possess objectionable tastes and odors and frequently are dark and discolored. Naturally such materials are highly undesirable for human consumption.

Various methods have been proposed for treating fat-soluble vitamin-bearing materials to remove objectionable tastes and odors, but few of these methods have proved to be entirely satisfactory. For one thing, the vitamin potency of the refined material is usually much less than that of the original material. Vitamin A is particularly susceptible to destruction as it is easily oxidized, and therefore great care must be taken in handling products containing the same.

A proposal has been made to deodorize and decolorize vitamin concentrates by dissolving the same in a suitable solvent and percolating the solution through a column or the like containing an animal or vegetable carbon or an earth while maintaining the system flooded with carbon dioxide. In this process the use of an antioxidant, such as hydroquinone or pyrogallol, is essential to protect the vitamins A and D against oxidation. While this process has displayed a slight degree of merit on a laboratory scale, it is inapplicable for commercial production. Moreover, the use of this type of an antioxidant is highly undesirable since it renders the process cumbersome, and also if these antioxidants are not removed, the product may be toxic. Furthermore, it has been found that the antioxidant does not function any too well in its role of protecting the vitamins against deterioration from oxidation during this refining process. Also the antioxidant usually must be removed from the solution after it has been passed through the column of carbon by treatment with an alkaline solution.

In other processes it has been attempted to render activated carbon suitable for use for refining vitamin-bearing materials by attempting to deaerate it by heating it under reduced pressure. Such a process has not been successful in completely deaerating the activated carbon as oxygen and carbon oxides are so strongly adsorbed on the surface of the carbon that such treatments will not remove them.

It is the object of this invention to provide an efficient and inexpensive process for the treatment of fat-soluble vitamin-containing materials to remove undesirable tastes, odors and colors therefrom.

Another object of this invention is to provide an improved process for the purification of vitamin A and D containing materials by the use of activated carbon.

A further object of this invention is to provide an efficient and inexpensive process for the treatment of fish liver oils and other marine oils by the use of activated carbons without having to use antioxidants to protect the vitamins from deterioration during the refining treatment.

Other objects of the invention will in part be obvious and will in part appear hereinafter.

I have now discovered that the foregoing and other objects may be realized by the following process, which comprises mixing activated carbon with water and completely deaerating the carbon-water mixture, and then treating the vitamin-bearing material with the deaerated carbon under reduced pressure. The deaerating process may be carried out by stirring the carbon-water mixture with or without the aid of heat and reduced pressure. However, it is preferred to heat the carbon-water mixture while maintained under a reduced pressure while stirring as the deaeration is thereby more quickly accomplished. After the vitamin-containing material has been treated with the deaerated carbon, it is separated from the carbon by filtering, decanting, centrifuging or some other suitable means.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention any suitable animal or vegetable carbon may be employed, examples of which include, inter alia, the following well-known products available on the market under the tradenames "Nuchar XXX," "Nuchar #2," "Nuchar 000," "Nuchar Aqua," "Nuchar C-145," "Nuchar GFO," "Nuchar Wa," "Darco 60," "Darco 90," "Darco K," etc. The foregoing and similar other products may be used alone or in combination with each other or in combination with colloidal clays, earths, etc. Likewise in certain cases a filter-aid may also be used to facilitate filtration of the purified vitamin-containing material.

The water which is used to deaerate the carbon has no deleterious affects on the vitamins contained in the material to be treated. The main function of the water is to remove adsorbed gases from the surface of the carbon.

For convenience in describing the process of the invention, vitamin-bearing oils, particularly fish liver oils, are the materials which will usually be mentioned in connection with the various steps. However, in all cases it is to be understood that the description applies equally well to other types of fat-soluble vitamin-bearing materials.

After selection of the activated carbon or combination of carbons, clays, earths, etc., and the admixture thereof with water, the most important step follows. Upon admixing the purifying agent or agents with the water, the step of deaeration of the mixture is effected. The process of deaerating the mixture must be carried out with the utmost care as the success of the whole process depends upon complete deaeration of the carbon before the vitamin-bearing material is treated therewith. The activated carbon may be mixed with the water in an open vessel and stirred until the last trace of air is eliminated. However, it is preferred to accelerate the process by heating the mixture or subjecting it to reduced pressure or both. When the water-carbon mixture has been completely deaerated, the vitamin-containing oil is run into the same or vice versa. While it is preferred to add the vitamin-containing oil directly, an organic solvent solution thereof may be added in some cases, particularly in the refining of the unsaponifiable fraction of the oil. The fact that only a small amount of water is required to deaerate the carbon and that no solvent need be used to dissolve the vitamin-bearing oil before adding it to the carbon is one reason why this process is far more economical than any used heretofore. Another feature of this process which adds to its economy is that less carbon is required in the treatment of a given amount of oil than what is required in any process heretofore developed in which the vitamins are not affected by the carbon refining.

In carrying out the preferred process of my invention, the activated carbon is deaerated by adding water to the carbon and stirring the mixture at a reduced pressure, preferably about 20 mm., while heating at a temperature between 50° C. to 170° C., preferably from 50° C. to 100° C. The amount of water used should be sufficient to completely wet the carbon. As soon as the carbon-water mixture is deaerated, the vitamin-bearing oil is run into the carbon-water mixture and the whole mass stirred at an elevated temperature and reduced pressure until the activated carbon has completed its function of adsorbing the impurities which impart the undesirable taste, color and odor to the original material. Usually by the time the impurities are all adsorbed by the activated carbon, the water in the mixture has all been evaporated or distilled off. While it is preferred to remove all of the water before the refined oil is removed from the carbon, this is not essential as any residual water may be removed during the step of removing the carbon from the refined vitamin oil. The heat applied to the carbon-water-oil-mixture serves a two-fold purpose in that it drives off the water and accelerates the adsorption of the impurities. Upon completion of the carbon refining step, the vitamin-bearing oil is separated from the carbon and any residual water by any well known method such as filtering, decanting, centrifuging, etc.

In some cases it may be desirable to allow all of the water to vaporize from the carbon before adding the vitamin-bearing material. In such a procedure the carbon is maintained continuously under reduced pressure while vaporizing the water and while treating the vitamin oil therewith. It is preferred, however, to add the vitamin material to be treated before all of the water is removed from the carbon.

In most instances after the oil or other fatty material has been removed from the activated carbon, it is advisable to wash the carbon with some suitable solvent for fatty materials in order to completely remove any such materials that may have been adsorbed. If desired, a suitable solvent may be added to the mixture before any of the oil is removed. The solvent is separated from the vitamin-bearing material by any usual method, e. g. vacuum distillation.

In treating vitamin concentrates (unsaponifiable fraction) according to the process of this invention, it is usually desirable to dissolve the concentrate in some suitable solvent, such as ethylene dichloride, before adding it to the deaerated carbon-water mixture as the concentrates are usually somewhat viscous or semi-solid, and by dissolving them in a solvent a somewhat better distribution in the carbon is obtained.

This invention is particularly directed to the purification of animal, vegetable and marine oils containing vitamins A and/or D, such as the liver oils obtained from cod, halibut, swordfish, pollack, tuna, shark, ling cod, jewfish and other fish, other marine oils such as sardine oil, herring oil, whale liver oil, etc., as well as palm oil, oils containing carotene (provitamin A), wheat germ oil (containing vitamin E), etc. The unsaponifiable fraction of the foregoing oils may also be treated according to the process. While the present process is particularly concerned with the purification of vitaminiferous materials of the aforementioned type, it is within the purview of the invention to employ the present process for the purification of synthetic vitamin products produced by the chemical or electrical activation of cholesterol, ergosterol, 7-dehydrocholesterol, wool grease and other similar materials. In refining the synthetic forms of vitamin D according to the process of the invention, oil solutions thereof should be employed.

Although the process of this invention has been described as a batch method, and it is preferred to carry it out in that manner, it may well be carried out as a continuous process and it is within the purview of this invention to so do.

The expression "vitaminiferous material" is used herein to generically connote any material bearing vitamin A and/or D, as well as materials containing the remaining known fat-soluble vitamins. The term "units of vitamin" as used herein is to be interpreted as the "U. S. P." units of the given vitamin.

For a fuller understanding of the nature and objects of the invention, reference should be had to the following examples which are given merely to further illustrate the invention and are not to be construed in a limiting sense, all parts given being by weight.

Example I 5 parts of activated carbon were mixed with 25 parts of water and the mixture heated to about 95° C. in the presence of $N_2$ gas and under a reduced pressure of about 20 mm. After 5 minutes 100 parts of crude shark liver oil containing 108,000 vitamin A units per gram were added and the mixture treated for about one hour under the above conditions. The mixture was then cooled to room temperature and the carbon removed by filtration. The resulting oil was much lighter in color, substantially devoid of taste and odor and was of the same vitamin A potency as the original oil.

Example II 10 parts of "Nuchar XXX," an activated carbon, were mixed with 20 parts of water and the mixture heated to about 60° C. under a reduced pressure of about 10 mm. After about 5 minutes, 100 parts of crude mackerel liver oil were added and the mixture treated further as in the above example. The resulting oil was devoid of fishiness and the vitamin potency was unchanged.

Example III 10 parts of a mixture of activated carbon and activated earth were mixed with 25 parts of water and the mixture heated to about 50° C. under a reduced pressure of 10 mm. 100 parts of tuna liver oil containing 140,000 A/gm. and 40,000 D/gm. were added and the mixture treated further as in Example I. The treated oil was greatly improved in taste, odor and color, and the vitamin A and D content was unchanged.

From the above description it can readily be seen that the process of my invention is far more economical than others previously proposed in that much less material is required to refine a given amount of oil than that required in other processes. The cost of the water to deaerate the carbon is practically negligible, the time required to carry out the process is much less than with other processes, and, as may be noted, from the above examples, the vitamin A completely withstands the purification process; in some cases the vitamin potency may even be increased because of the removal of free fatty acids along with the adsorbed impurities.

Because of the economy and simplicity of the process of my invention, it is believed that it will be of great interest to those engaged in the refining of vitamin-bearing fats and oils and similar materials, and that it is indeed a worthy contribution to the art.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent, is:

1. In a process of refining a fat-soluble vitamin-containing material, the step which comprises treating a vitamin-containing material with completely deaerated activated carbon in the presence of heat and under reduced pressure.

2. In a process of refining a vitamin-containing oil, the step which comprises heating the oil under reduced pressure in contact with deaerated activated carbon completely wetted with water.

3. In a process of refining a fish liver oil, the step which comprises heating the oil under reduced pressure in contact with an activated carbon completely wetted with water.

4. A process of refining a vitamin-bearing material, which comprises admixing activated carbon and water, completely deaerating the carbon-water mixture by means of heat under reduced pressure, heating a fat-soluble vitamin-bearing material with the deaerated carbon under reduced pressure and separating the refined oil from the carbon and impurities adsorbed thereon.

5. A process of refining a vitamin-bearing oil, which comprises admixing activated carbon and water, completely deaerating the carbon-water mixture by means of heat under reduced pressure, heating a fat-soluble vitamin-bearing oil with the deaerated carbon under reduced pressure until all of the water is removed from the oil-carbon-water mixture, and separating the refined oil from the carbon and impurities adsorbed thereon.

6. A process of refining a vitamin-containing material, which comprises admixing an activated carbon, a colloidal clay and water in a vessel, completely deaerating the carbon-clay-water mixture by means of heat under reduced pressure, heating a fish liver oil with the deaerated mixture under a reduced pressure, and separating the refined oil from the clay, carbon and impurities adsorbed thereon.

7. A process of refining vitamin-containing materials, which comprises admixing an activated carbon, a colloidal clay and water in a vessel, completely deaerating the carbon-clay-water mixture by heating under a reduced pressure, treating a fish liver oil with the deaerated mixture at a reduced pressure and an elevated temperature, maintaining the oil-carbon-clay-water mixture at an elevated temperature and a reduced pressure until all of the water is removed from the mixture, and separating the refined oil from the clay, carbon and impurities adsorbed thereon by filtration.

8. In a process of refining a vitamin-bearing material, the step which comprises treating a vitamin concentrate with a completely deaerated activated carbon-water mixture under reduced pressure and at an elevated temperature.

9. In a process of refining a vitamin-bearing material, the step which comprises treating a fish liver oil concentrate with a completely deaerated activated carbon-water mixture under reduced pressure and at an elevated temperature.

10. A process of refining a vitamin-bearing material, which comprises admixing an activated carbon and water, completely deaerating the activated carbon-water mixture by heating under reduced pressure, heating a fish liver oil concentrate with the deaerated mixture under reduced pressure and separating the refined concentrate from the carbon and impurities adsorbed thereon.

11. A process of refining a vitamin-bearing material, which comprises admixing an activated carbon and water, completely deaerating the actiavted carbon-water mixture by heating the mixture under reduced pressure, treating a fish liver oil concentrate with the deaerated mixture at a reduced pressure and elevated temperature, maintaining the concentrate-carbon-water mixture at an elevated temperature and reduced pressure until all of the water is removed, and removing the refined concentrate from the carbon and impurities adsorbed thereon by extracting the concentrate from the carbon with a solvent therefor.

12. The process of claim 11 in which ethylene dichloride is used to extract the vitamin concentrate from the carbon and impurities adsorbed thereon.

13. A process of refining a vitamin-bearing material, which comprises admixing an activated carbon, a colloidal clay and water, completely deaerating the carbon-clay-water mixture by means of heat under reduced pressure, heating a fish liver oil concentrate with the deaerated mixture under reduced pressure, and separating the refined concentrate from the carbon and impurities adsorbed thereon.

14. A process of refining a vitamin-bearing material, which comprises admixing an activated carbon, a colloidal clay and water, completely deaerating the carbon-clay-water mixture by heating under reduced pressure, treating a fish liver oil concentrate with the deaerated mixture at a reduced pressure and an elevated temperature, maintaining the concentrate-carbon-clay-water mixture at an elevated temperature and a reduced pressure until all of the water is removed from the mixture, and removing the concentrate from the clay and carbon and impurities adsorbed thereon by treating the mixture with some suitable solvent for vitaminiferous materials.

15. In a process of refining a vitamin-bearing material, the step which comprises heating an oil containing provitamin A with a completely deaerated activated carbon-water mixture under reduced pressure.

16. In a process of refining a vitamin-bearing material, the step which comprises heating a wheat germ oil with a completely deaerated activated carbon-water mixture under reduced pressure.

17. In a process of refining a fish liver oil, the step which comprises heating the oil with a completely deaerated activated carbon-water mixture under reduced pressure.

LORAN O. BUXTON